United States Patent [19]
Röck et al.

[11] Patent Number: 4,874,212
[45] Date of Patent: Oct. 17, 1989

[54] DEVICE FOR FASTENING A FRONT PLATE TO METAL DRAWER SIDE WALLS

[75] Inventors: Erich Röck, Höchst; Klaus Brüstle, Lauterach, both of Australia

[73] Assignee: Julius Blum Gesellschaft M.B.H., Höchst, Australia

[21] Appl. No.: 191,021

[22] Filed: May 3, 1988

[30] Foreign Application Priority Data

May 4, 1987 [AT] Austria .................................. 1103/87

[51] Int. Cl.⁴ ............................................. A47B 88/04
[52] U.S. Cl. ................................. 312/330.1; 312/334; 312/263; 403/4; 403/199
[58] Field of Search ............ 312/330 R, 330 SM, 334, 312/263; 403/4, 199, 245, 246

[56] References Cited

U.S. PATENT DOCUMENTS

| | | | |
|---|---|---|---|
| 4,458,965 | 7/1984 | Ohlendorf et al. | 312/330 R |
| 4,595,245 | 6/1986 | Rock et al. | 312/330 R |
| 4,690,469 | 9/1987 | Grass | 312/330 R |
| 4,705,328 | 10/1987 | Rock et al. | 312/330 R |

FOREIGN PATENT DOCUMENTS

| | | | |
|---|---|---|---|
| 0096898 | 12/1983 | European Pat. Off. | 312/330 R |
| 3135788 | 8/1982 | Fed. Rep. of Germany | 312/330 R |
| 3148066 | 10/1982 | Fed. Rep. of Germany | 312/330 R |

*Primary Examiner*—Kenneth J. Dorner
*Assistant Examiner*—Brian K. Green
*Attorney, Agent, or Firm*—Wenderoth, Lind & Ponack

[57] ABSTRACT

A device for fastening a drawer front plate to a drawer metal drawer side wall having in a front end thereof a recess includes a block having a groove and fastened to the front plate by dowels. The drawer side wall is insertable into the groove. An adjustment plate which is held in the block projects into the recess of the drawer side wall. The drawer side wall has a slot which is disposed behind the recess and into which engages a projection protruding from a side wall of the block. An adjustment plate which abuts with the upper and lower edges of the recess in the side wall is arranged in the groove of the block.

8 Claims, 3 Drawing Sheets

DEVICE FOR FASTENING A FRONT PLATE TO METAL DRAWER SIDE WALLS

FIELD AND BACKGROUND OF THE INVENTION

The present invention relates to a device for fastening a drawer front plate to metal drawer side walls each of which has in a front end thereof a recess. The device includes, for each side of the drawer, a block which is fastened to the front plate and which is provided with a groove into which one of the drawer side walls is insertable. A slot is provided behind the recess in the drawer side wall, and a projection of the block protrudes from one side wall of the groove thereof and engages in the slot. A part of the block extends into the recess of the drawer side wall. A device of this type is known, for example from U.S. Pat. No. 3,752,553.

Apart from drawers which are manufactured as integral structures, in particular drawers of plastics material, drawers are frequently used which are assembled from various parts. Such drawers in most cases are provided with fittings which form a part of the pull-out guide assembly which facilitates extraction and insertion of the drawer from and into the body of the piece of furniture, respectively.

Modern drawers further have a holding means for the front plate which permits adjustment of the position of the front plate after mounting in order to correct the alignment of the drawer with respect to the joints and the sides of the piece of furniture, when the drawer has already been inserted into the body of the piece of furniture.

Furthermore, drawers are known which have metal drawer side walls. Such side walls have the advantage that the pull-out rails of the pull-out guide assembly can be directly formed therewith.

SUMMARY OF THE INVENTION

It is the object of the invention to provide a device for fastening a drawer front plate which permits, in addition to a simple and quick way of anchoring the front plate to metal drawer side walls of the above-described type, a vertical adjustment of the front plate and at the same time the fixing of a zero position. Moreover, the mounted front plate should be removable from the drawer side walls.

According to the invention this is achieved in that a block, which is preferably made of plastics material, projects freely from the front plate. A screw which is aligned parallel to the front plate extends through the block and through the slot in the side wall in the region of the projection and connects the two sections of the block which are separated by the groove. An adjustment plate is disposed in the groove and projects in the mounted position into the recess of the drawer side wall and abuts at top and bottom edges with edges of the recess.

It is advantageously provided that the adjustment plate is provided with teeth or serrations which engage in corresponding teeth or serrations in the block. The adjustment plate, the edges of which abut at the top and at the bottom with edges of the recess, is held by the serrations with respect to the block. Thus, an automatic zero or initial position for the front plate is set. If an adjustment of the position of the front plate in the upward or downward directions becomes necessary, the front plate nevertheless can be displaced with the block at each side of the drawer with respect to the adjustment plate, and thereby the side wall since the engagement of the serrations can be overcome. This can be further facilitated by manufacturing the block of plastics material. When the front plate is in the correct position, the clamping screw is fastened and the front plate thereby is finally positioned with respect to the side wall.

A further embodiment of the invention, in which adjustment of the front plate as well as fixing of the front plate in the zero position is possible, provides that the adjustment plate and the block are connected by means of an eccentric. Prior to mounting, the eccentric can be moved into a zero position, and the block again is held by means of the adjustment plate at a specific height with respect to the drawer side wall. An adjustment in the upward or downward directions can be obtained by turning the eccentric.

It is advantageously provided that the block has, adjoining the slot, at least one recess in which the adjustment plate is guided.

BRIEF DESCRIPTION OF THE DRAWINGS

In the following two embodiments of the invention will be described in more detail with reference to the accompanying drawings, in which.

DETAILED DESCRIPTION OF THE INVENTION

Figure 1:
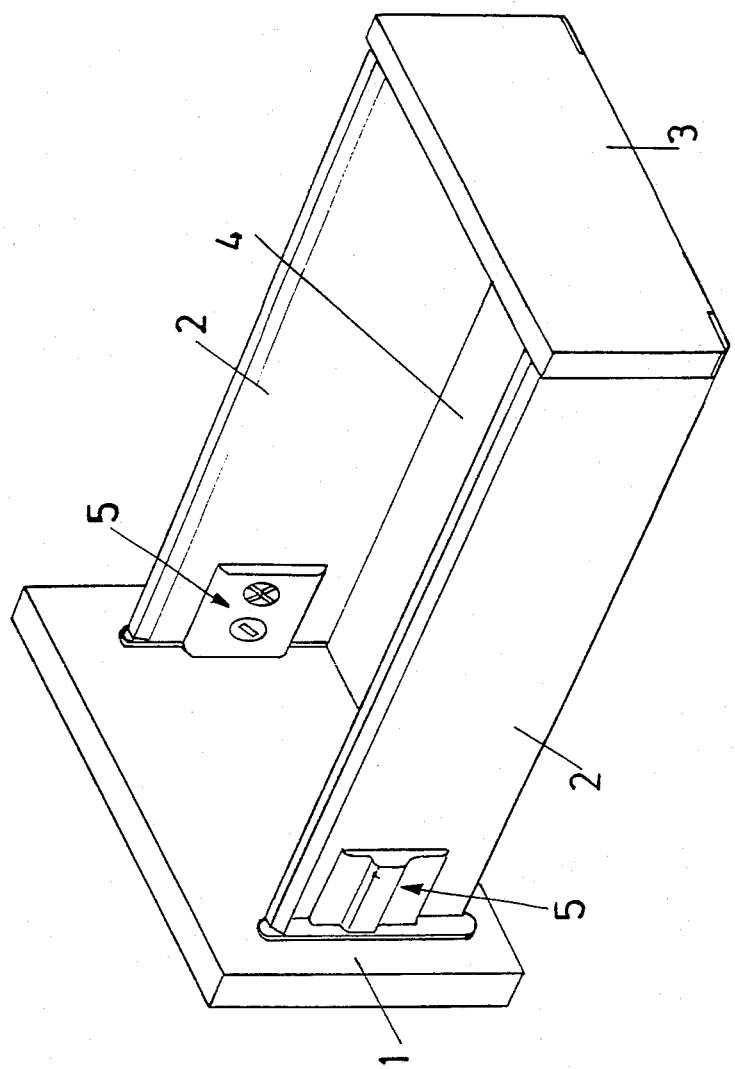
FIG. 1 is a perspective view of a drawer with two devices according to the invention.

In the drawings, a front plate is indicated by reference number 1, each drawer side wall by reference number 2, a rear wall by reference number 3 and a drawer bottom by reference number 4.

Figure 2:
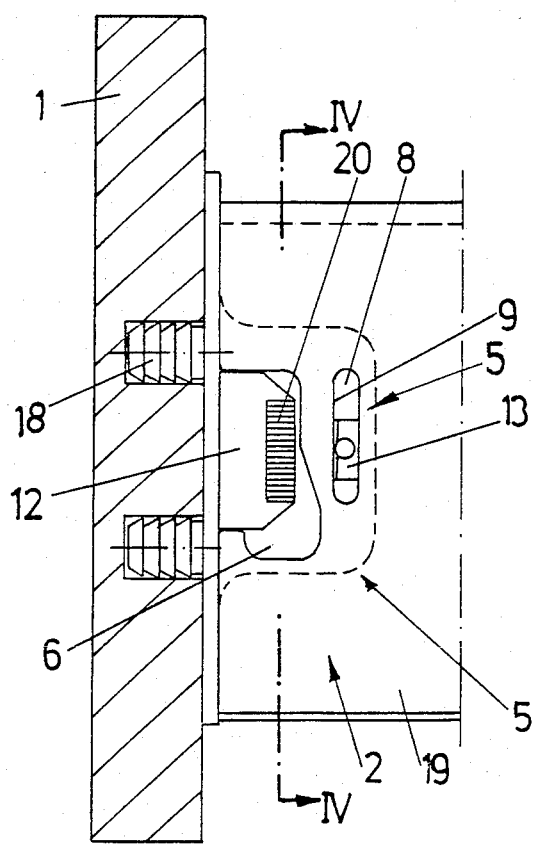
FIG. 2 is a side view of the front end of a side wall of the drawer.
Figure 4:
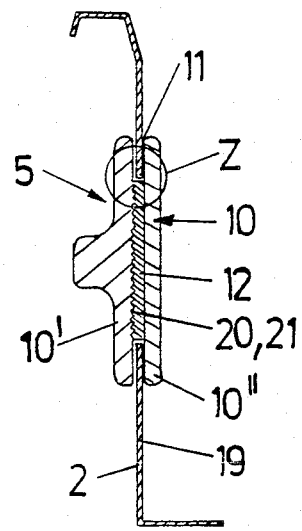
FIG. 4 is a sectional view along line IV—IV of FIG. 2.
Figure 3:
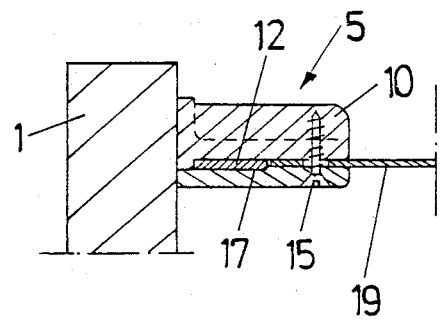
FIG. 3 is a top sectional view of the front end of a drawer side wall with a front plate in a mounted position.
Figure 5:
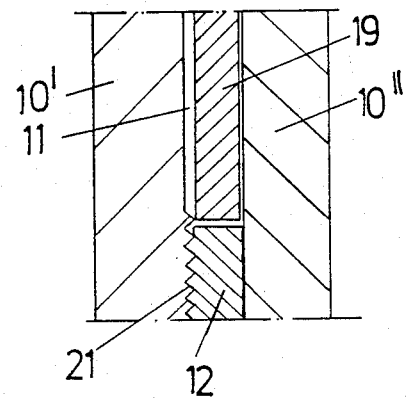
FIG. 5 is an enlarged view of detail Z of FIG. 4.

The front plate 1 is fastened to the drawer side walls 2 by means of the devices 5 according to the invention. As can particularly be seen from FIGS. 2 and 6, each drawer side wall 2 has in the front end thereof a recess 6. In the region of the recess 6, the drawer side wall 2 may be provided with an upwardly extending projection or nose 7. A vertical slot 8 is arranged behind the recess 6, and an edge 9 of the slot 8 advantageously is bevelled.

The device 5 according to the invention, which may be of injection molded plastics material, comprises a block 10 which has a groove 11. An adjustment plate 12 is arranged in the groove 11. A trapezoid projection 13 is formed on the block 10 and extends from one side wall of the groove 11. In the region of the projection 13 the block 10 is provided with an opening which extends transversely through the block 10 and is adapted to receive a clamping screw 15. On one side of the block 10, this opening has a widened portion 16 which can fully receive a bevelled head of the clamping screw 15.

The block 10 of device 5 is provided with dowels 18 by means of which it is fastened to the front plate 1. When mounting the front plate 1, the blocks 10 of devices 5 are mounted on the front plate 1.

The front plate 1 need only be pushed toward the drawer side walls 2 in such a manner that, for each device 5, the adjustment plate 12 of the block 10 is vertically snugly received in the recess 6 and that the two opposite portions or sections 10', 10" of the block 10 which are separated by the groove 11 embrace opposite sides vertical flange 19 of the drawer side wall 2. The adjustment plate 12 is guided in a recess 17 of the block 10. When the block 10 is fitted in this manner onto the drawer side wall 2, the projection 13 engages in the slot 8, and the front plate 1 is initially positioned on the drawer side walls 2.

The vertical adjustment of the front plate 1, i.e. of the zero position thereof, is set in various ways in the illustrated embodiments of the invention.

In the embodiment according to FIGS. 2 to 5, the adjustment plate 12 is provided with teeth or serrations 20 which engage in corresponding teeth or serrations 21 in the block 10. This engaging arrangement of the two groups of serrations 20, 21 is sufficient to avoid a displacement of the block 10 with respect to the adjustment plate 12 due only to the weight of the front plate 1. If an adjustment of the front plate 1 in the upward or downward directions is necessary, however, the front plate, and thus the block 10, can be displaced relative to plate 12 and side wall 2 with sufficient force that the coupling effect between the serrations 20, 21 is overcome.

Figure 6:
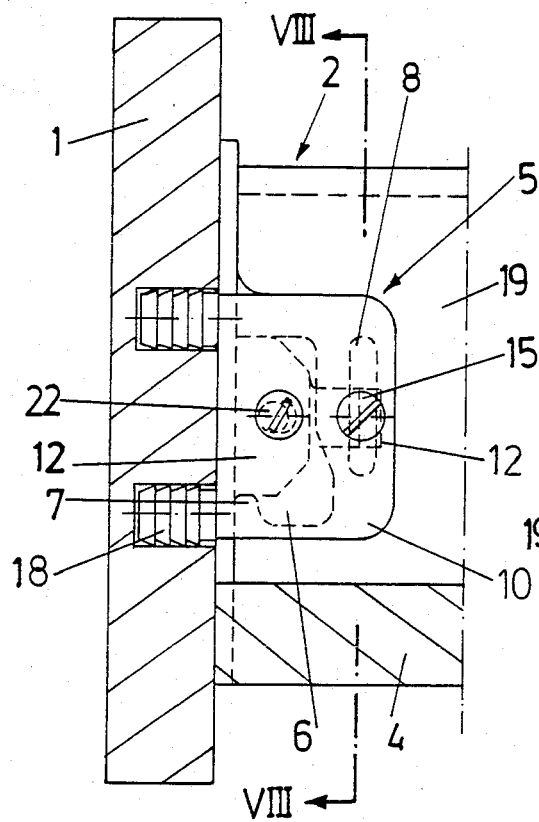
FIG. 6 is a side view of the front end of a drawer side wall and a mounted front plate according to a further embodiment of the invention.
Figure 8:
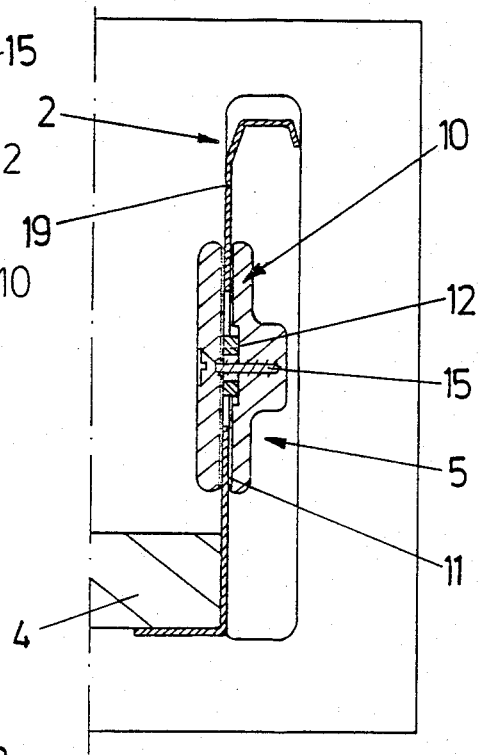
FIG. 8 is a sectional view along line VIII—VIII of FIG. 6.
Figure 7:
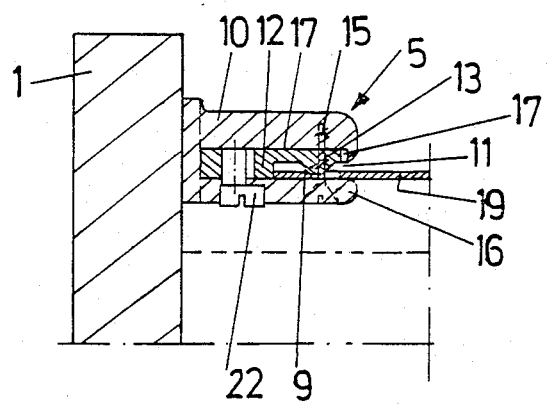
FIG. 7 is a top sectional view of such drawer side wall and front plate.

In the embodiment according to FIGS. 6 to 8, the block 10 and the adjustment plate 12 are connected to each other by means of an eccentric 22. The eccentric 22 can set the zero position of the front plate 1, as well as effect the vertical adjustment of the front plate 1.

For final fastening of the front plate 1, the clamping screws 15 at both side walls are tightened into the blocks 10. Thus, high forces can act on the front plate 1 without the latter being pulled off the drawer side walls 2 unintentionally.

We claim:

1. A device for use in mounting a drawer front panel to a metal side wall of the drawer, said device comprising:
   a block member formed of plastic material and adapted to be attached to a drawer front panel, said block member having therein a groove defined by spaced portions of said block member;
   an adjustment plate positioned within said groove;
   a projection extending into said groove from one of said portions of said block member or from said adjustment plate;
   whereby said block member is fittable over a front end of a drawer metal side wall with the side wall inserted in said groove with said portions of said block member embracing opposite sides of the front end of the side wall, with said adjustment plate adapted to extend into a recess formed in the front end of the side wall and having upper and lower edges to abut upper and lower edges, respectively, of the side wall defining the recess, and with said projection extending into a slot formed in the side wall behind the recess, to thereby form means for initially fastening said block to the side wall;
   cooperating means provided on said block member and on said adjustment plate for selectively adjusting the relative vertical position of said block member, and thereby of the front plate, with respect to said adjustment plate, and thereby to the side wall; and
   screw means, extending in a direction to be parallel to the front plate and transverse to said groove and adapted to extend through the slot in the side wall, for tightly connecting said portions of said block member to the side wall, and thereby for preventing further vertical adjustment.

2. A device as claimed in claim 1, wherein said screw means extends through said projection.

3. A device as claimed in claim 1, wherein said projection extends integrally from said one portion of said block member.

4. A device as claimed in claim 1, wherein said projection extends integrally from said adjustment plate.

5. A device as claimed in claim 1, wherein said cooperating adjusting means comprise engaging serrations on confronting surfaces of said adjustment plate and of said block member.

6. A device as claimed in claim 1, wherein said cooperating adjusting means comprises an eccentric connecting said adjustment plate to said block member.

7. A device as claimed in claim 1, wherein said block member has therein a recess laterally adjoining said groove, and said adjustment plate is guided in said groove.

8. An assembly comprising a device as claimed in claim 1 in combination with a front end of a metal side wall of a drawer, said front end having therein a recess defined by upper and lower edges in abutment with said upper and lower edges, respectively, of said adjustment plate, said side wall having therein, at a position behind said recess, a slot, said projection extending into said slot, and said screw means extending through said slot.

* * * * *